Patented Nov. 19, 1929

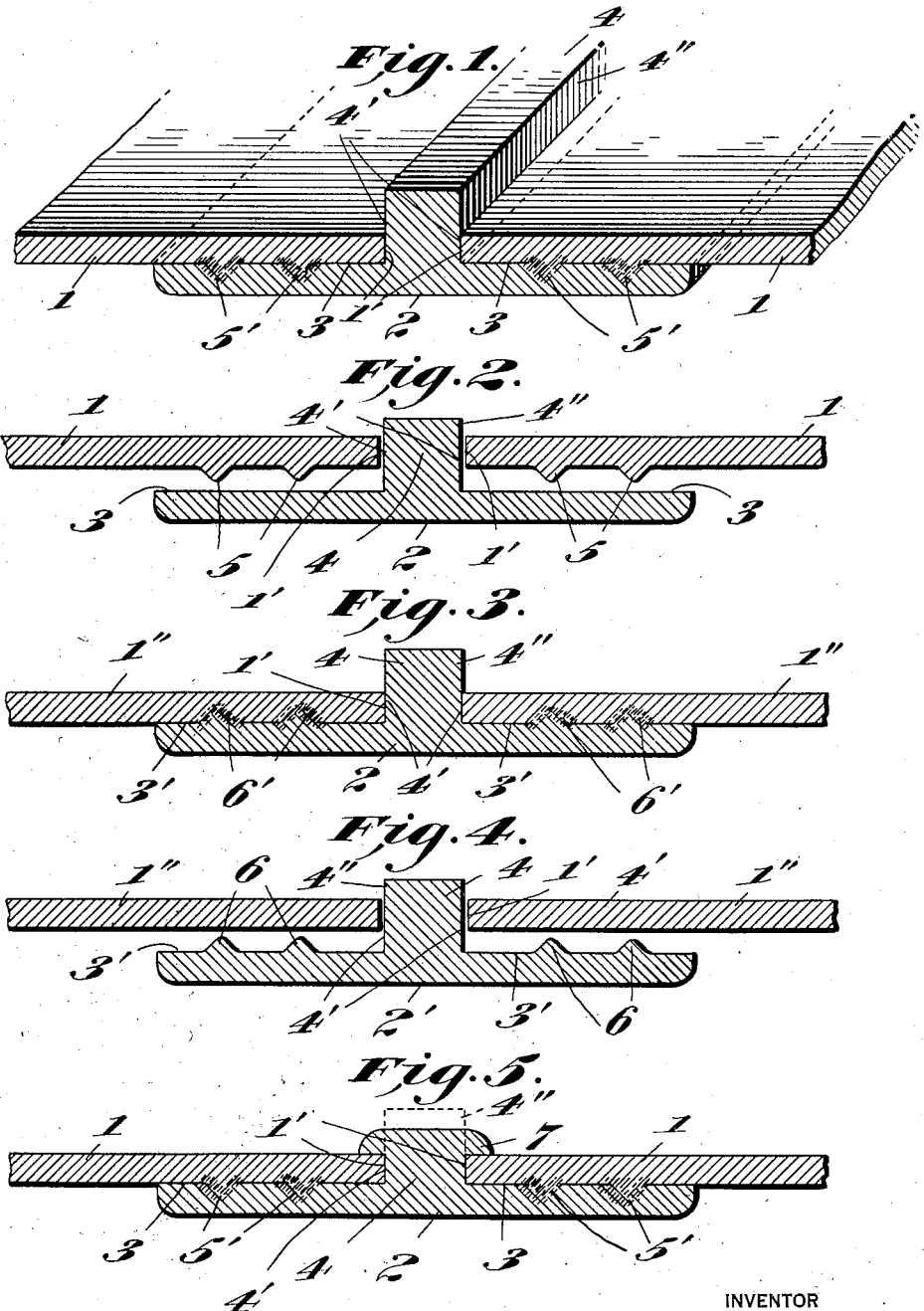

1,736,539

UNITED STATES PATENT OFFICE

MAURICE LACHMAN, OF NEW YORK, N. Y., ASSIGNOR TO BETHLEHEM STEEL COMPANY

WELDED AND CALKED BODY AND PROCESS OF PRODUCING SAME

Application filed October 14, 1927. Serial No. 226,086.

My invention relates to the joining of plates or other bodies of metal by electric welding. More particularly it is directed to the joining of metal bodies in such a way as to provide a calking effect as well as the union of the parts.

This combined result is secured by the use of a uniting body which is provided with a surface or face shaped to conform to the surfaces of the bodies which are to be united and provided with an elevated member intermediate of said face. The edges or ends of the bodies to be joined are positioned on each side of the elevated member of the uniting body and the adjacent portions of the faces of the bodies to be united are welded to the face of the uniting body. Preferably the elevated member of the uniting body is of sufficient height so that following the welding operation it may be upset so as to overlap the united bodies. Thus the uniting body serves both to join the other bodies and to calk the joint.

To illustrate my invention it will be shown as applied to the joining of two metal plates.

Referring to the drawings:

Fig. 1 is a perspective view of portions of two plates which have been joined by the use of an intermediate body, the elevated member not having as yet been upset;

Fig. 2 is a cross section through portions of the plates to be united and the uniting body in approximate position for the welding operation;

Fig. 3 is a cross section of a welded joint in which the welding ridges are provided on the uniting member rather than on the plates to be united, a modification in this respect of what is shown in Figs. 1 and 2;

Fig. 4 is a cross section, similar to that of Fig. 2, but of the arrangement of welding ridges indicated in the modification of Fig. 3; and Fig. 5 is a cross section of the joint of Fig. 1, after upsetting of the upper part of the elevated member.

Referring to the illustration of the invention in Figs. 1, 2 and 5:

A uniting body 2 is provided with a flat face 3, corresponding therefore with the flat faces of plates 1 which are to be joined. Intermediate of face 3 is the elevated member 4 provided with the flat faces 4' corresponding to the flat edges 1' of plate 1. This elevated member extends straight across the face of the uniting body 2, in this respect also conforming to the shape of the edges of plates 1, these plates being shown as having straight edges. Obviously if the edges were of a different shape the elevated member would need be correspondingly different. On the portions of plate surfaces adjacent to the edge are welding ridges or points 5.

To join plates 1 they are so positioned as to bring their edges adjacent to and on each side of the elevated member 4 of the uniting body, and with the adjacent portions of the surfaces of the plate opposite to face 3 of the uniting body, the welding contacts 5 being contiguous to said face 3. Electric current is then passed between the plates and the uniting body the resulting heating action softening the material of these bodies. The plates being pressed against the uniting body during this operation, the welding ridges penetrate the material of the uniting body. Obviously in carrying out this welding operation the usual advantages of this type of welding will be secured. In this form of welding there will be more or less intermingling of the material of the bodies united, the metal of ridges 5 being intermingled with that of body 2 as indicated at 5'.

Following the welding operation the upper portion 4″ of the elevated member, which extends above the surface of the united plates is preferably upset as indicated at 7 in Fig. 5.

By this process it will be readily seen that a strong joint can be produced and that such joint will be tight because of the calking action of the elevated member. Especially is this true when this member is upset as shown in Fig. 5.

Obviously it is immaterial whether the welding ridges are located in the plates to be united or on the uniting body. In Figs. 3 and 4 welding ridges 6 are provided on face 3' of the uniting body 2', instead of upon the plates to be joined as in the previously described form. Upon carrying out the welding operation the welding ridges will penetrate plates 1'' as indicated at 6'.

While the invention has been illustrated as applied to the joining of flat plates, it is obvious that the invention may be applied to the union of other bodies and of various formations. For example, the plates or bodies to be joined may be curved, in which case the surface of the uniting body should be shaped in conformity to this variation.

It is clear too that the edges of the bodies to be joined may be of various shapes in which case the elevated portion of the uniting body should be correspondingly altered.

The invention has been described as applied to the joining of two bodies but it is obvious that the principle of the invention is applicable to the joining of a plurality, the uniting body or bodies being corerspondingly varied. It is obvious also that the invention may be applied to the uniting of two parts of the same body.

The utility of the invention will be obvious; by means of it strong and tight joints may be made in any situation where desirable such as, for example, in the construction of boilers and tanks.

Having described my invention what I desire to secure protection upon is set forth in the following claims:

1. A process for joining two bodies, comprising the steps of providing a uniting body having a face conforming in shape to the faces of the bodies to be joined and having an elevated member at an intermediate portion of said face of the uniting body conforming in shape to the edges of the bodies to be joined, providing extended welding ridges on the faces to be welded of certain of the bodies extending in the same general direction as that of the elevated member, positioning the edges of the bodies to be joined on each side of the elevated member, passing electric current through the bodies to be joined and the uniting body to weld them.

2. A process for joining two bodies, comprising the steps of providing a uniting body having a face conforming in shape to the faces of the bodies to be joined and having an elevated member at an intermediate portion of said face of the uniting body conforming in shape to the edges of the bodies to be joined, providing extended welding ridges on the faces to be welded of certain of the bodies extending in the same general direction as that of the elevated member, positioning the edges of the bodies to be joined on each side of the elevated member, passing electric current through the bodies to be joined and the uniting body to weld them, and upsetting the upper portion of the elevated member to overlap the adjacent portions of the united bodies.

3. A joint structure comprising two body elements, a uniting body having a face conforming in shape to the faces of the body elements and having an elevated member intermediate of said face of the uniting body conforming in shape to the edges of said body elements, the faces of said body elements being welded to said face of the uniting body with the edges of the body elements adjacent to the elevated member, said elevated member having a portion overlapping the adjacent portions of the body elements, certain of said uniting bodies having extended welding ridges extending in the same general direction as that of the elevated member and penetrating the substance of other of the united bodies.

In testimony whereof I hereunto affix my signature.

MAURICE LACHMAN.